United States Patent
Syed et al.

(10) Patent No.: US 10,128,786 B2
(45) Date of Patent: Nov. 13, 2018

(54) ELECTRIC VEHICLE ELECTRIC DRIVE SYSTEM

(71) Applicant: Ford Global Technologies, LLC, Dearborn, MI (US)

(72) Inventors: Fazal Urrahman Syed, Canton, MI (US); Shailesh Shrikant Kozarekar, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 15/406,104

(22) Filed: Jan. 13, 2017

(65) Prior Publication Data

US 2018/0205341 A1    Jul. 19, 2018

(51) Int. Cl.
| | | |
|---|---|---|
| *B60L 1/00* | (2006.01) | |
| *B60L 11/00* | (2006.01) | |
| *H02P 27/06* | (2006.01) | |
| *H02M 3/04* | (2006.01) | |
| *H02M 7/44* | (2006.01) | |
| *B60L 11/18* | (2006.01) | |

(52) U.S. Cl.
CPC ........... *H02P 27/06* (2013.01); *B60L 11/1811* (2013.01); *H02M 3/04* (2013.01); *H02M 7/44* (2013.01); *B60L 2210/10* (2013.01); *Y10S 903/904* (2013.01)

(58) Field of Classification Search
CPC ...... H02P 27/06; B60L 11/00; B60L 11/1811; B60L 2210/10; H02M 3/04; H02M 7/44; Y10S 903/904
USPC .................................................. 307/9.1, 10.1
See application file for complete search history.

(56) References Cited

U.S. PATENT DOCUMENTS

| | | | |
|---|---|---|---|
| 6,331,365 B1 * | 12/2001 | King ................... | B60L 11/1803 320/103 |
| 2006/0039224 A1 * | 2/2006 | Lotfi ...................... | G11C 5/14 365/226 |
| 2014/0319919 A1 * | 10/2014 | Fu ......................... | H02M 7/539 307/82 |
| 2016/0036323 A1 | 2/2016 | She et al. | |
| 2016/0211675 A1 | 7/2016 | Joehren et al. | |
| 2016/0336855 A1 * | 11/2016 | Ozanoglu ............. | H02M 7/003 |

* cited by examiner

*Primary Examiner* — Hal Kaplan
(74) *Attorney, Agent, or Firm* — Brooks Kushman P.C.

(57) ABSTRACT

A vehicle may include an inverter, a motor coupled to the inverter, and a traction battery coupled to the inverter and having a terminal voltage equal to a rail voltage between rails of the inverter such that the rail voltage is unregulated. The vehicle may also include a voltage converter configured to reduce the terminal voltage below an intermediate bus voltage threshold on an intermediate bus, and an auxiliary converter configured to draw power from the intermediate bus to supply auxiliary loads.

17 Claims, 2 Drawing Sheets

ELECTRIC VEHICLE ELECTRIC DRIVE SYSTEM

TECHNICAL FIELD

The present disclosure relates to electric drive systems for vehicles.

BACKGROUND

Electric vehicles include an electric machine for electricity generation and propulsion. The electric machines may have an inverter to convert direct current to alternating current required by the electric machine. A high-voltage or traction battery may supply electricity to the traction electric machine or motor. The inverter may include a boost converter to increase the voltage of rails associated with the inverter to maintain the inverter voltage supplied by the battery.

SUMMARY

A vehicle may include an inverter, a motor coupled to the inverter, and a traction battery coupled to the inverter and having a terminal voltage equal to a rail voltage between rails of the inverter such that the rail voltage is unregulated. The vehicle may also include a voltage converter configured to reduce the terminal voltage below an intermediate bus voltage threshold on an intermediate bus, and an auxiliary converter configured to draw power from the intermediate bus to supply auxiliary loads.

A vehicle electrical distribution system may include a half bridge buck converter configured to draw power from a traction battery that may be electrically coupled to an inverter rail and may have a terminal voltage equal to a voltage of the inverter rail, and step down the terminal voltage to an intermediate bus voltage that supplies power to an auxiliary voltage regulator that may be configured to maintain an auxiliary bus voltage of an auxiliary bus.

A method may be performed by a controller of a vehicle and may include the steps of operating switches of a voltage converter to reduce a terminal voltage of a traction battery to supply an intermediate bus, operating switches of an inverter drawing an unregulated voltage from the traction battery equal to the terminal voltage of the battery to drive an electric machine, and operating switches of an auxiliary converter to reduce an intermediate voltage of the intermediate bus to supply auxiliary loads.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Hybrid vehicles and electric vehicles have electric drive systems to provide and receive power from electric machines. The electric machines may be traction motors, generators, or a combination thereof. The electric drive system may include a high-voltage or traction battery. The traction battery may be configured to directly provide the voltage required by the inverter. Meaning, the rails of the inverter are connected to the battery without a boost converter. The higher voltage battery makes standard auxiliary load converters (e.g., electric air conditioning, auxiliary voltage bus) unable to drop the voltage as required by the standard configuration today. In order to maintain a voltage at the required auxiliary loads, a variable voltage buck converter may be configured to drop the bus voltage provided by the traction battery such that the auxiliary voltage converters can drop the voltage further without adjustment. Therefore, power savings can be realized by the electric vehicle by increasing the terminal voltage of the traction battery and providing a buck converter without additional modification.

Figure 1:
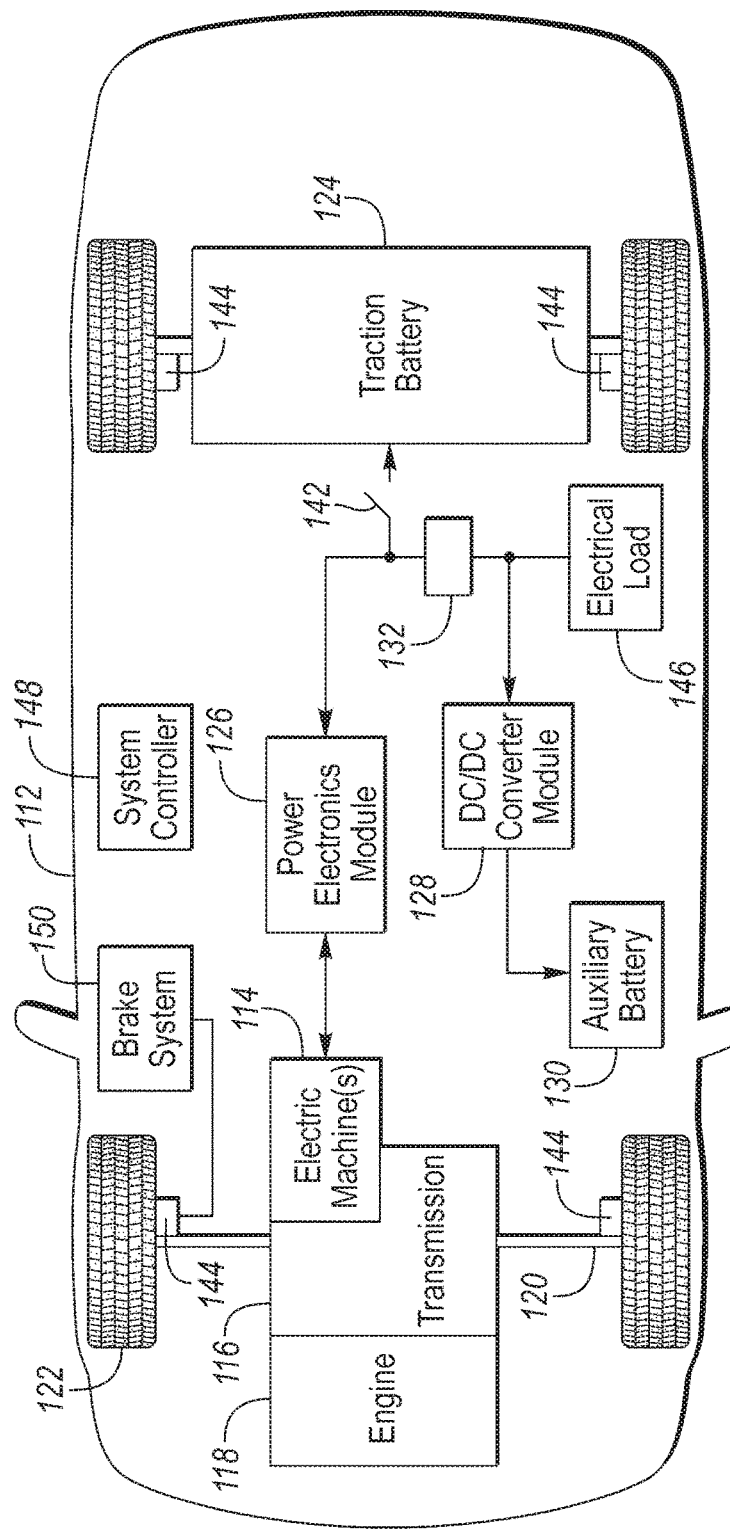
FIG. 1 is an overview of a hybrid electric vehicle having a power-split configuration.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. A buck converter 132 may be located on the high voltage bus to reduce bus voltages for the electric loads 146 and DC/DC converter 128. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
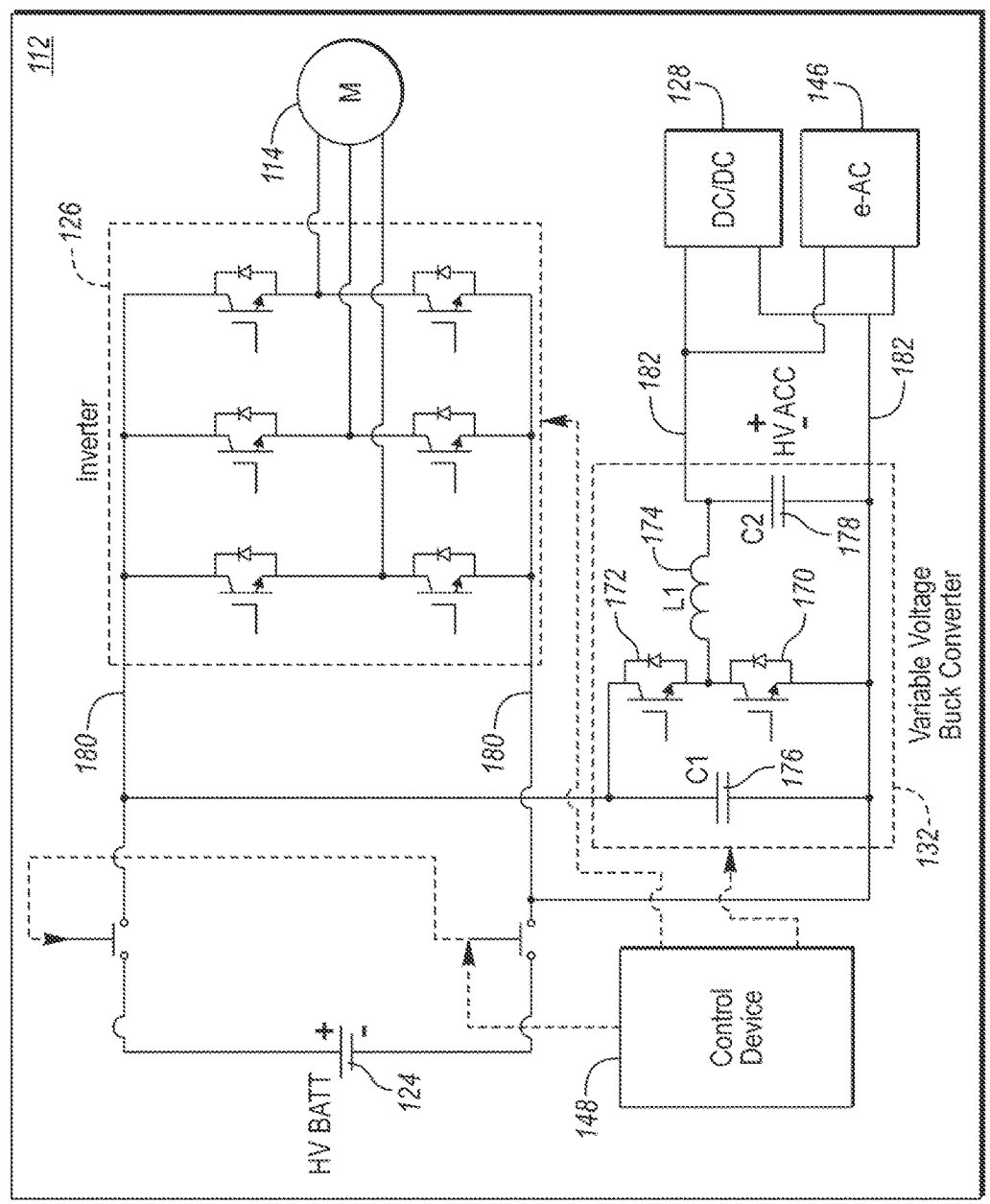
FIG. 2 is an electrical drive schematic for hybrid electric vehicle having a buck converter.

Now referring to FIG. 2, an electrical distribution system for the vehicle 112 is shown. The distribution system has a high voltage traction battery 124 connected to rails 180 of the inverter 126. The rails 180 have the same voltage as the terminals of the traction battery 124. The terminal voltage may be greater than 500 volts. The inverter 126 is connected to a traction motor 114 or generator. A voltage converter 132 is connected in parallel with the inverter 126 and high voltage battery 124. The voltage converter 132 has an output to an intermediate bus 182 that powers other auxiliary loads, including a DC/DC converter 128 and an electric AC compressor DC/DC converter 146. The voltage converter 132 may be a buck converter as shown in FIG. 2 or another type of voltage regulator known or presently unknown in the art. The intermediate bus 182 may have a voltage less than 400 volts. Both converters 128, 146 are auxiliary regulators for additional electrical loads. The auxiliary regulators 128, 146 may also be buck converters or any other type of voltage regulator known or presently unknown in the art. The auxiliary regulators may be configured to maintain an auxiliary bus voltage of an auxiliary bus to supply said electrical loads. The auxiliary electrical loads may be a vehicle air conditioning system, a heating system, infotainment systems, vehicle control systems, or other vehicle or non-vehicle loads that require stepped down voltage. The voltage converter 132 may include an upper and lower switch 172, 170, each having respective anti-parallel diodes, and an interposed inductor 174 capacitor pair 178 in a low pass filter arrangement. The switches may be IGBT switches or any other type of semiconductor switch. The vehicle may also include a smoothing capacitor 176 in parallel with the rails 180 of the inverter 126 to maintain rail voltage.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an inverter;
   a motor coupled to the inverter;
   a traction battery coupled to the inverter and having a terminal voltage equal to a rail voltage between rails of the inverter such that the rail voltage is unregulated;
   a voltage converter configured to reduce the terminal voltage below an intermediate bus voltage threshold on an intermediate bus; and
   an auxiliary converter configured to draw power from the intermediate bus to supply auxiliary loads.

2. The vehicle of claim 1, wherein the voltage converter includes an upper and lower switch, each having respective anti-parallel diodes, and an interposed inductor capacitor pair in a low pass filter output arrangement such that output voltage is regulated by toggling of the switches.

3. The vehicle of claim 1, wherein the voltage converter is a buck converter.

4. The vehicle of claim 1, wherein the auxiliary converter is a buck converter.

5. The vehicle of claim 1, wherein the intermediate bus voltage threshold is 400 volts.

6. The vehicle of claim 1, wherein the terminal voltage is above 400 volts.

7. A vehicle electrical distribution system comprising:
a half bridge buck converter configured to
draw power from a traction battery that is electrically coupled to an inverter rail and has a terminal voltage equal to a voltage of the inverter rail, and
step down the terminal voltage to an intermediate bus voltage that supplies power to an auxiliary voltage regulator that is configured to maintain an auxiliary bus voltage of an auxiliary bus.

8. The vehicle electrical distribution system of claim 7, wherein the terminal voltage is greater than 400 volts.

9. The vehicle electrical distribution system of claim 7, wherein the intermediate bus voltage is less than 400 volts.

10. The vehicle electrical distribution system of claim 7, wherein the auxiliary bus is connected to a vehicle air conditioning system.

11. The vehicle electrical distribution system of claim 7, wherein the auxiliary bus is connected to an auxiliary battery.

12. A method comprising:
by a controller of a vehicle,
operating a voltage converter and inverter connected to an unregulated terminal voltage of a traction battery such that the voltage converter reduces the voltage to supply an intermediate bus voltage and the inverter drives an electric machine; and
operating an auxiliary converter to reduce the intermediate bus voltage to supply auxiliary loads.

13. The method of claim 12, wherein the voltage converter includes an upper and lower switch, each having respective anti-parallel diodes, and an interposed inductor capacitor pair in a low pass filter output arrangement such that output voltage is regulated by toggling of the switches.

14. The method of claim 12, wherein the voltage converter is a buck converter.

15. The method of claim 12, wherein the auxiliary converter is a buck converter.

16. The method of claim 12, wherein the intermediate bus has a voltage threshold of 400 volts.

17. The method of claim 12, wherein the terminal voltage is above 400 volts.

* * * * *